United States Patent [19]

Koike et al.

[11] Patent Number: 5,368,808

[45] Date of Patent: Nov. 29, 1994

[54] BLOWBAG MANUFACTURING METHOD

[75] Inventors: Yoshio Koike, Saitama; Kazuya Matsumoto, Ayase; Hisatoshi Saito, Kawasaki, all of Japan

[73] Assignees: Kyoraku Co., Ltd., Kyoto; Kewpie Kabushiku Kaisha, Tokyo, both of Japan

[21] Appl. No.: 861,874

[22] PCT Filed: Oct. 15, 1990

[86] PCT No.: PCT/JP91/01401

§ 371 Date: Jun. 19, 1992

§ 102(e) Date: Jun. 19, 1992

[87] PCT Pub. No.: WO92/07703

PCT Pub. Date: May 14, 1992

[30] Foreign Application Priority Data

Oct. 26, 1990 [JP] Japan .................. 2-290203
Oct. 26, 1990 [JP] Japan .................. 2-290204

[51] Int. Cl.$^5$ .................................... B29C 49/00
[52] U.S. Cl. .................................... 264/512; 101/35; 427/256
[58] Field of Search ............... 264/132, 509, 512, 515; 427/256; 101/35

[56] References Cited

U.S. PATENT DOCUMENTS

| | | | |
|---|---|---|---|
| 2,491,947 | 12/1949 | Bardash | 101/35 |
| 2,601,700 | 7/1952 | Pinsky et al. | 264/132 |
| 2,751,841 | 6/1956 | Grape . | |
| 3,072,969 | 1/1963 | DuBois | 264/132 |
| 3,286,005 | 11/1966 | Cook | 264/132 |
| 3,608,268 | 9/1971 | Lauritzen | 264/515 |
| 3,881,410 | 5/1975 | Shenoha . | |
| 4,202,663 | 5/1980 | Haigh | 156/277 |
| 4,880,425 | 11/1989 | Kuhlemann et al. | 604/404 |

FOREIGN PATENT DOCUMENTS

| | | | |
|---|---|---|---|
| 2212751 | 10/1973 | Germany | 264/516 |
| 851980 | 10/1960 | United Kingdom . | |
| 679491 | 9/1982 | United Kingdom . | |

*Primary Examiner*—Catherine Timm
*Attorney, Agent, or Firm*—Dickstein, Shapiro & Morin

[57] ABSTRACT

A blowbag manufacturing method for manufacturing blowbags made of thermoplastic material and which are used for containing pharmaceuticals, foodstuffs, cosmetics and the like. The blowbag manufacturing method of the present invention, blowmolds a blowbag having a body portion (1) with opposing walls which are flat in section and an opening portion (2) connected to the body portion (1), supports the flat surfaces of the blowmolded blowbag body portion (1) by a pressing surface (8) of a pressing jig (6) having an area smaller than the flat surfaces and so that those flat surfaces are in close contact, and prints required items to an upper surface of those opposing wall surfaces of the body portion (1) in close contact.

6 Claims, 5 Drawing Sheets

BLOWBAG MANUFACTURING METHOD

TECHNICAL FIELD

The present invention relates to a manufacturing method for blowbag (flexible container) comprising a thermoplastic material and used for containing pharmaceuticals, foodstuffs, cosmetics and the like.

BACKGROUND ART

Flexible blowbottles comprising a thermoplastic material and used for containing pharmaceuticals, foodstuffs, cosmetics and the like have been widely known conventionally to the extent that no further description here is necessary.

In general, the body portion of such blowbottles deforms when a plate for printing is pressed to their surface due to their flexibility, it is extremely difficult to use direct printing to indicate the contents of the bottle and the like.

Therefore, the conventional method has been to apply a positive pressure to the inside of the bottle and to achieve a balance between the positive pressure and the printing pressure so that the shape of the bottle is maintained when direct printing is performed thereon.

However, as shown in FIG. 9, in the case of a blowbag, when the sectional shape of the body portion is flat, and when it is comprised of a thermoplastic material having a the ratio of bending elasticity of between 500–10000 kg/cm$^2$, the application of a positive pressure to the inside of the blowbag flexibly deforms the body portion 1 of the blowbag when printing is performed to that surface using a transfer roller 7, and it is difficult to maintain the required shape of the blowbag. As a result, it is extremely difficult to balance the printing pressure and the positive pressure, slippage occurs when there is printing and it is extremely difficult to have suitable printing.

In light of these problems, the present invention has as an object the provision of a blowbag manufacturing method which supports the blowbag body portion by a pressing surface of a pressing jig, and which is in close contact with an opposing wall of a blowbag so that slippage during printing of this upper surface of a body portion in this status of close contact is completely prevented, and so that even in the case of a flexible blowbag comprising a thermoplastic material having a ratio of bending elasticity of between 500–10000 kg/cm$^2$, it is possible for the body portion to have highly accurate printing by a transfer roller.

DISCLOSURE OF THE INVENTION

The blowbag manufacturing method of the present invention blowmolds a blowbag having a body portion with opposing walls which are flat in section and an opening portion connected to the body portion, and comprising a thermoplastic material having a ratio of bending elasticity of between 500–10000 kg/cm$^2$, and flat surfaces of the blowmolded blowbag body portion are supported by a pressing surface of a pressing jig having an area smaller than the flat surfaces and so that the flat surfaces are in close contact, and required items are printed to an upper side wall surface of opposing walls of the body portion and which are in close contact with the pressing jig.

In addition, in the process of pressing the pressing jig, a frame member is provided from above, so as to correspond to a side surface of a pressing surface, and the required items are then printed onto the surface of the blowbag.

According to the blowbag manufacturing method of the present invention, a body portion of a blowbag comprising a thermoplastic material is supported and pressed by a pressing surface of a pressing jig having an area smaller than the flat surface, and in the process of pressing the pressing jig, a periphery of a body portion is pressed by a member corresponding to a side surface of a pressing surface from above and so opposing walls of a body portion are in a status of close contact. Then, when the blowbag is in such as status, required printing is performed to a body portion which is being held flat on a pressing surface of a pressing jig.

BEST MODE FOR CARRYING OUT THE INVENTION

The following is a description of the first embodiment of the blowbag manufacturing method of the present invention, and with reference to FIGS. 1 through 5.

Figure 1:
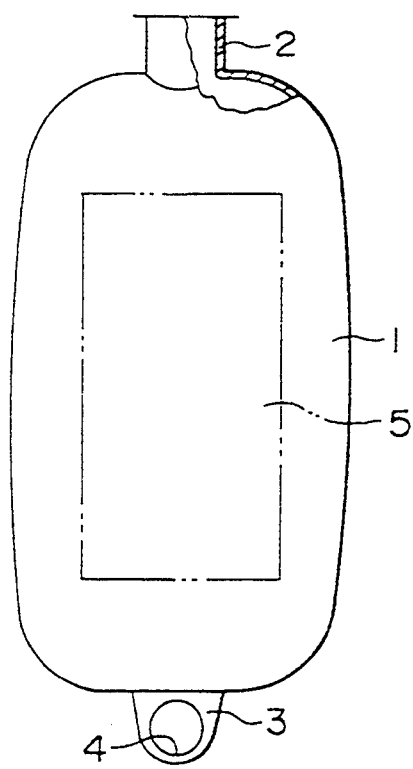
FIG. 1 is a front elevation view of a pharmaceutical liquid container which is one example of a blowbag relating to the present invention.
Figure 2:
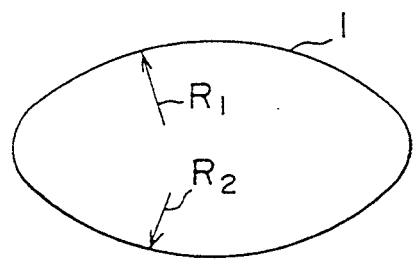
FIG. 2 is a sectional view of the above.

FIGS. 1 and 2 show examples of pharmaceutical liquid containers which are examples of blowbags manufactured by the blowbag manufacturing method of one embodiment of the present invention. These pharmaceutical containers are configured with a sectional shape having a body portion (See FIG. 2) formed from flat opposing walls formed with relatively large radii of curvatures $R_1$, $R_2$, an opening 2, a suspension hole 4 and a suspension fitting 3. This pharmaceutical liquid container is blowmolded from a thermoplastic material. More specifically, it is molded from a thermoplastic material such as linear low-density polyethylene, low-density polyethylene, high-density polyethylene, polypropylene, ethylene-polypropylene copolymer, polyvinyl chloride, ethylene vinyl acetate copolymer, thermoplastic elastomers (olefins, polyesters, polyamides, polyurethanes, styrenes) and the like and which have a ratio of bending elasticity of between 500–10000 kg/cm$^2$. The surface of the body portion 1 of the pharmaceutical liquid container is printed with a display portion 5 that indicates the contents and the like therein.

The blowbag manufacturing method according to the present invention includes a process for the blow molding of the pharmaceutical liquid container as described above, and a process for printing the display 5 for the contents and the like, to the surface of the body portion 1 of the pharmaceutical liquid container which has been blowmolded.

Figure 3:
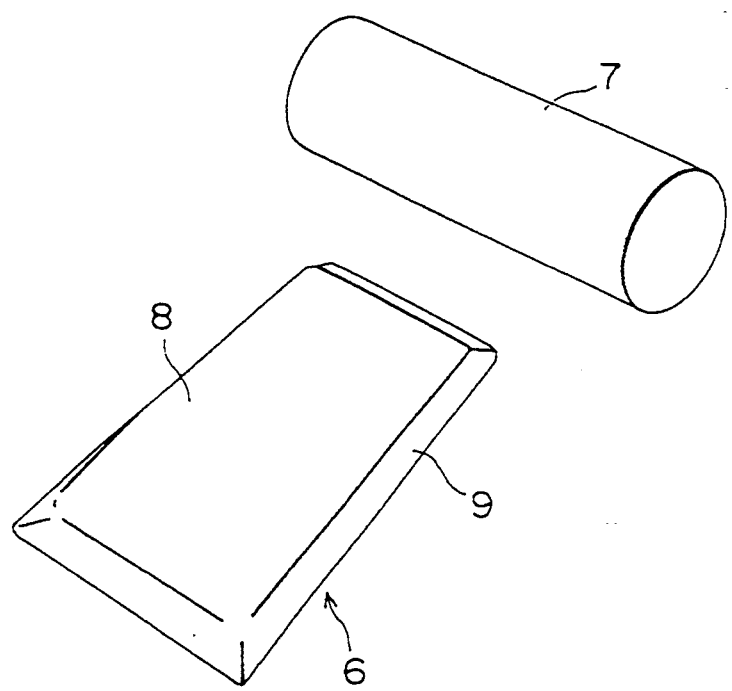
FIG. 3 is a perspective view of one example of an apparatus used in the blowbag manufacturing method of a first embodiment of the present invention.

FIG. 3 shows one example of an apparatus used in the blowbag manufacturing method of the first embodiment of the present invention. This apparatus comprises a pressing jig 6 and a transfer roller 7 for printing. The area of the pressing surface 8 of the pressing jig 6 is smaller than the surface of projection of the body portion 1 and is a flat surface narrower than the body portion 1, but is formed larger than the portion to be printed (display 5). In addition, the edge 9 of the pressing surface 8 is an inclined surface.

Figure 4:
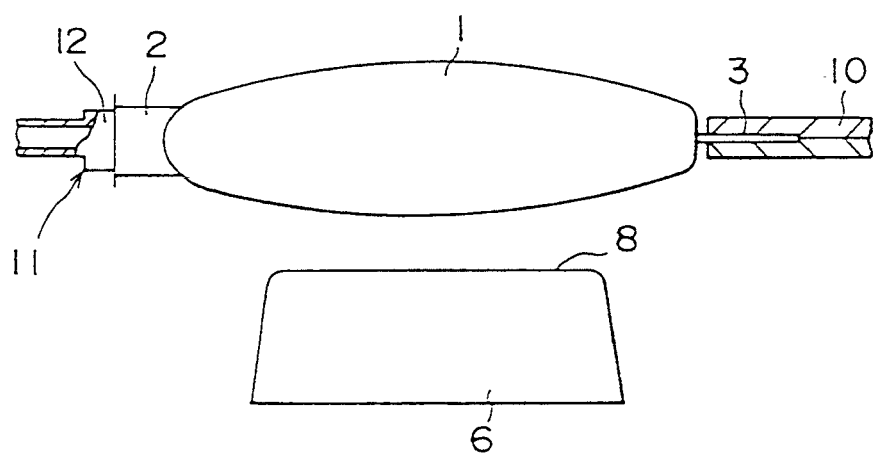
FIG. 4 and FIG. 5 are partial cutaway side views for describing a blowbag printing process according to the first embodiment of the present invention.

As shown in FIG. 4, a pharmaceutical liquid container from the blow molding process has the surfaces of the body portion 1 on the pressing surface 8 of the pressing jig 6 made to correspond with each other and the suspension fitting 3 is fixed to the suspension fitting fixing portion 10 and the opening portion 2 is fixed to the opening fixing portion 11.

Figure 5:
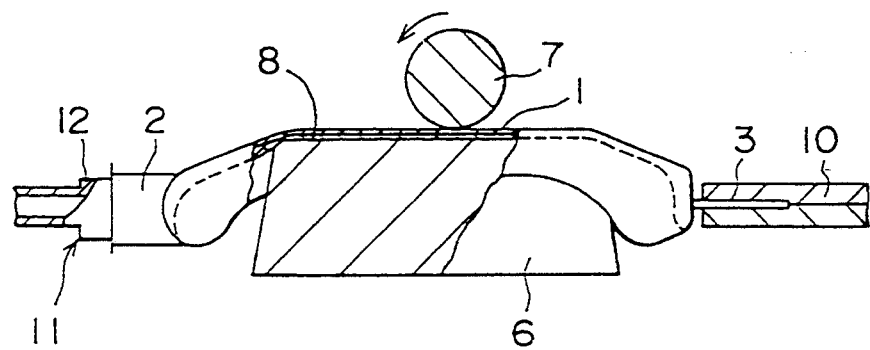

As shown in FIG. 5, if the pressing jig 6 is pressed in the direction of pressing (the direction perpendicular to the surface of the body portion 1) when there is this status, the body portion 1 of the container becomes a status where the opposing surfaces are in close contact with each other and are fixed on the pressing surface 8 of the pressing jig 6. Then, if the transfer roller 7 for printing is pressed and rolled in the direction shown by the arrow, to one of the surfaces of the body portion 1, the contents of printing on the outer peripheral surface of the transfer roller 7 for printing are printed to the print display (See FIG. 1) on the body portion 1.

After printing, ultraviolet light (UV) is irradiated to the print surface of the container and the printing is dried.

Moreover, in this printing process described above, the opening fixing portion 11 is made a suction cup 12 such as that shown in the figure, and if the air inside the container is forcedly evacuated, the container quickly becomes a negative pressure and so it is possible for the opposing walls of the body portion 1 to be brought into close contact quickly and for there to be complete airtightness. As a result, the accuracy of printing is improved and it is possible to perform the printing of fine and complex printing to the surface of the container.

In addition, according to the first embodiment, the printing which is printing performed by a transfer roller can be performed by some other transfer member such as a pad which is hemispherical in section, or by silk screening or offset printing or the like.

Moreover, the flat surfaces of the body portion of the blowbag of the present invention are shown as being formed with comparatively large radii of curvatures $R_1$, $R_2$ but the surfaces can be surfaces which are generally flat.

As has been described above, a blowbag according to the present invention is formed of a thermoplastic material which has for example a ratio of bending elasticity of between 500–10000 kg/cm$^2$ and which has a unified opening and a body portion which is flat. Because of this, one body portion can be changed to the shape of another wall of the body portion and it is possible for the opposing walls to be effectively brought into close contact and the contents liquid efficiently evacuated. Accordingly, a blowbag according to the present invention is a new type of container which has the function of combining the advantages of a sheet bag obtained by overlapping two films and adhering their edges, into close contact, and of a blowbottle obtained by blowing a plastic into a bottle shape.

Figure 6:
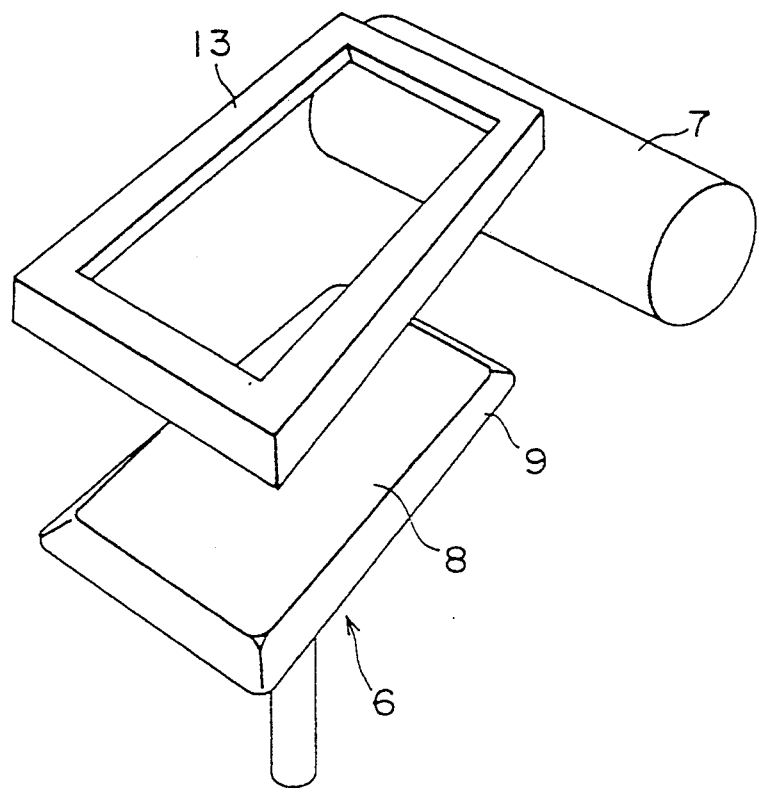
FIG. 6 is a perspective view of one example of an apparatus used in the blowbag manufacturing method of a second embodiment of the present invention.
Figure 7:
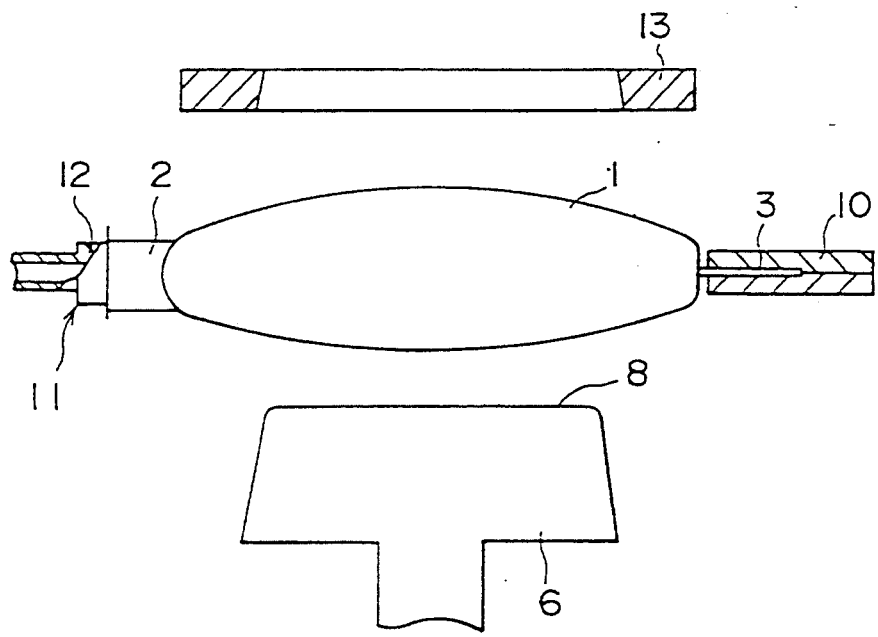
FIG. 7 and FIG. 8 are partial cutaway side views of the apparatus, for describing a blowbag printing process according to the second embodiment.
Figure 8:
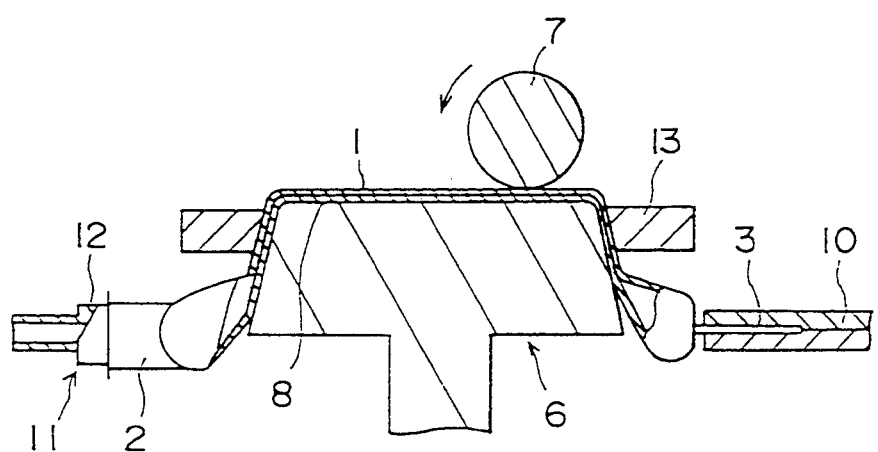
Figure 9:
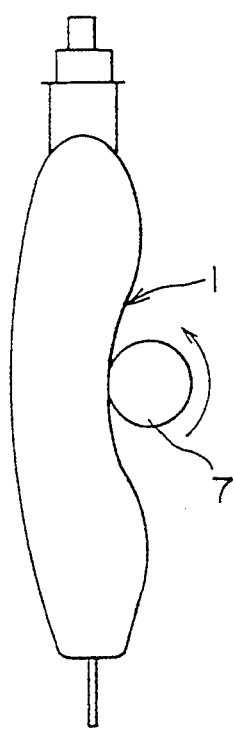
FIG. 9 is a side elevational view describing a conventional printing method.

The following is a description of the second embodiment of the present invention, with reference to FIGS. 6 through 8.

FIG. 6 shows one example of an apparatus used in the blowbag manufacturing method of a second embodiment of the present invention. This apparatus comprises a pressing jig 6 and a transfer roller 7 for printing. In the same manner as for the first embodiment, the area of the pressing surface 8 of the pressing jig 6 has a smaller area than the surface of projection of the body portion 1 of the container and is formed flat and to be narrower than the body portion 1. The edge 9 of the pressing surface 8 is an inclined surface. There is also a frame member 13 which is arranged so that it corresponds to the side surface of the pressing surface 8 from above in the process where the pressing jig 6 is pressed. The frame member 13 can be any member which has the action described above, and need not be of the same shape.

As shown in FIG. 7, a pharmaceutical liquid container manufactured by the blow-molding process has one of the surfaces of the body portion 1 in contact with the top of the pressing jig 6 and the suspension fitting 3 of the body portion 1 fixed to the suspension fitting fixing portion 10 and the opening portion 2 fixed to the opening fixing portion 11. And the frame member 13 is situated above the body portion.

As shown in FIG. 8, when there is this status, the pressing jig 6 is pressed to the body portion 1 and when the frame member 13 is pressed at the same time in this process, the body portion 1 of the pharmaceutical liquid container becomes the status where its opposing walls are brought into close contact and are sandwiched between the frame member 13 and the top of the pressing surface 8 of the pressing jig 6 and are securely fixed. Then, if the transfer roller 7 for printing is pressed and rolled against the surface of the body portion 1, the contents of printing on the outer peripheral surface of the transfer roller 7 for printing are transferred and printed to the body portion 1. In this printing process, the body portion 1 is securely fixed, and it is possible to have highly accurate printing since there is no slippage.

After printing, ultraviolet light (UV) is irradiated to the print surface of the container and the printing is dried.

The blowbag manufacturing method according to the present invention blowmolds a blowbag having a body portion with opposing walls which are flat in section and an opening portion connected to the body portion, and for example, made of a thermoplastic material having a ratio of bending elasticity of between 500–10000 kg/cm$^2$, and supports flat surfaces of the blowmolded blowbag body portion by a pressing surface of a pressing jig having an area smaller than the flat surfaces or the flat surfaces of its opposing walls are brought into close contact, in the process of pressing the pressing jig, by a member corresponding to a side surface of the pressing surface pressed from above and required items are printed to a surface of the body portion in close contact. Because of this, it is possible for opposing walls of a body portion to be completely brought into close contact and for slippage between opposing walls of a body portion in this status of close contact to be completely prevented, and for it to be possible to implement high-accuracy printing to the body portion even if there is a blowbag (flexible container) made of a thermoplastic material.

INDUSTRIAL APPLICABILITY

As has been described above, the blowbag manufacturing method of the present invention is suitable for printing information relating to the contents and the like to a blowbag (flexible container) made of a thermoplastic material and which is used to contain pharmaceuticals, foodstuffs, cosmetics and the like.

We claim:

1. A blowbag manufacturing method, comprising the steps of:

blow molding a blowbag of a thermoplastic material having a body portion with opposing walls which are flat and an opening portion connected to said body portion;

supporting said blowbag by at least one fixing portion and by a pressing jig, said flat opposing walls of said body portion being supported by a pressing surface of said pressing jig, said pressing surface having an area smaller than the lower surface of said body portion after said body portion is collapsed so as that said flat opposing walls are in close contact with each other; and printing indicia on a surface of said closely contacted opposing walls by a transfer member;

wherein said at least one fixing portion comprises a suspension fitting fixing portion and an opening fixing portion which are used to support said blowbag during said printing, and said blowbag includes a suspension fitting fixing portion fixed to said suspension fitting fixing portion, said opening portion of said blowbag being fixed to said opening fixing portion.

2. The blowbag manufacturing method of claim 1, wherein said transfer member is a transfer roller for printing.

3. The blowbag manufacturing method of claim 1, wherein said transfer member is a pad for printing which is hemispherical in section.

4. The blowbag manufacturing method of claim 1, wherein said opening fixing portion is a suction cup.

5. The blowbag manufacturing method of claim 1, further comprising the step of pressing a frame member having a shape corresponding to a side surface of the pressing surface to a periphery of the upper side of said body portion while said body portion is supported by said pressing surface so that said opposing walls of said body portion are brought into close contact with each other during said printing.

6. The blowbag manufacturing method of claim 5, wherein said pressing jig has inclined surfaces at the edges of said pressing surface, said frame member pressing said body portion against said pressing jig so that said flat opposing walls are brought into close contact with each other.

* * * * *

UNITED STATES PATENT AND TRADEMARK OFFICE
CERTIFICATE OF CORRECTION

PATENT NO. : 5,368,808
DATED : November 29, 1994
INVENTOR(S) : Yoshio Koike, et al.

It is certified that error appears in the above-indentified patent and that said Letters Patent is hereby corrected as shown below:

```
Title page, item
[22]PCT Filed:

"Oct. 15, 1990" should read --Oct. 15, 1991--.
```

Signed and Sealed this

Twenty-eight Day of March, 1995

Attest:

BRUCE LEHMAN

*Attesting Officer*  *Commissioner of Patents and Trademarks*